United States Patent Office 2,746,920
Patented May 22, 1956

---

2,746,920

WASTE PICKLE LIQUOR DISPOSAL

John M. Wunderley, Liberty, Pa.

No Drawing. Application July 7, 1952,
Serial No. 297,578

4 Claims. (Cl. 210—2)

---

This invention relates to a method of conditioning waste pickle liquor for disposal which involves mixing it with granulated basic slag to thereby neutralize its acid content and to fix its iron content against removal from the slag.

This application is a continuation-in-part of my copending application Serial No. 165,880, filed June 2, 1950, now abandoned.

The practice of pickling steel mill products to remove iron scale is well known. For this purpose, the articles from which the iron scale is to be removed are placed in an acid pickling bath. The acid bath is most commonly a sulphuric acid bath in which the strength of the acid generally varies from about 5 to 7%. As the pickling operations proceed, the acid strength of the bath gradually reduces, and acid is added to maintain its strength. However, when the iron content of the bath due to dissolved scale increases to approximately 7% iron or 20% ferrous sulphate, the operation becomes inefficient, and the operator starts to "kill" the bath which involves allowing the bath to fall below 5% acid by not adding any more acid. The bath is then dumped and a new batch of acid is made up for pickling purposes.

The spent pickling bath is commonly referred to as waste pickle liquor and presents a disposal problem in that its acid and iron content renders it unsuitable for drainage into streams. Various methods have been proposed for neutralizing the waste pickle liquor. One method has been to add iron which reacts with the acid of the liquor to form iron sulphate which is then recovered by suitable processes. Another method of treating involves neutralizing the acid with an alkali such as lime, soda ash, or caustic soda.

The neutralization of waste pickle liquor with lime, soda ash, or caustic soda necessitates expensive equipment and many handling operations. It is necessary to provide proportioning apparatus for mixing the alkali with water to form a slurry. A mixer must be provided in which the slurry is mixed with the waste pickle liquor. In the case of caustic soda, a heat exchanger for cooling the material coming from the proportioning apparatus must be provided. From the mixing tank, the waste material must be transferred to a settling tank wherein the solids, mainly calcium sulphate, are allowed to settle from the liquid in which they are suspended. These solids form a sludge which presents another difficult and expensive disposal problem.

This invention has as its principal object the provision of a method of handling and treating waste pickle liquor to neutralize the acid content thereof which will eliminate the expensive equipment and handling operations required of conventional treating processes as mentioned above. To this end, my invention utilizes another steel mill waste product, granulated blast furnace slag, in the treatment of the waste pickle liquor. In accordance with the principles of this invention, the waste pickle liquor is mixed directly with the granulated blast furnace slag to neutralize the acid content of the waste pickle liquor. This mixing operation is conducted in such manner that the liquid content of the waste pickle liquor is taken up or absorbed entirely by the blast furnace slag. While the mixing operation may be conducted in any suitable mixing apparatus, an apparatus specially adapted for mixing the pickle liquor with granulated blast furnace slag is shown and described in my copending application Serial No. 297,579, filed July 7, 1952, executed on even date herewith, to which reference is hereby made.

For neutralizing spent pickle liquor, its mixture with crushed limestone or crushed blast furnace slag has been proposed. Mention of the use of these materials is made in an article entitled "Waste problems of the iron and steel industry" by Willard W. Hodge at page 1364 of the November, 1939, issue of Industrial and Engineering Chemistry. However, as there stated, these materials were found impractical for the reason that the reaction was too slow due to the surface of the materials becoming coated with an impervious layer of calcium sulphate which retarded or stopped the neutralizing action. As will become apparent, this disadvantage is avoided by the use, in accordance with the principles of this invention, of granulated basic slag.

The blast furnace slag used in the method of this invention is a granulated basic slag such as is formed when molten slag is flowed into water. Bulletin 479, published in 1949 by the Bureau of Mines, United States Department of the Interior, at page 55, gives an average chemical analysis of basic slag as follows:

| $SiO_2$ | $Al_2O_3$ | $CaO$ | $MgO$ | $FeO$ | $MnO$ | $S$ |
|---|---|---|---|---|---|---|
| 36.0 | 12.4 | 41.6 | 6.2 | 0.48 | 1.34 | 1.39 |

The granulation of the slag which takes place when it is flowed into water produces small particles of slag of very irregular shape having many tentacle-like projections thereon, or cracks and crevices therein. Due to this formation of the slag particles in granulated slag, it will absorb large quantities of liquor with which it is mixed. Moreover, such particles have an extremely large surface area as compared with crushed limestone or crushed air-cooled slag, the particles of which are relatively smooth and will not absorb the liquid content or provide the neutralizing effect of granulated slag.

In accordance with the principles of this invention, the granulated slag is placed in mixing apparatus to which the pickle liquor to be treated is added. As the waste pickle liquor is added and mixed with the slag, the color of the slag changes from its normal light color to a very dark gray. When this mixture is discharged from the mixer and exposed to the drying and oxidizing action of the air, its color changes in a short while to a light gray. After further drying and oxidizing in air for a period of several hours to several days, the color of the mixture changes to red-brown or rust. The chemical reactions believed responsible for these changes will be described below. The extent to which the acid is neutralized has been found to increase as the proportion of slag to acid is increased, and with the length of time in which the mixing action is carried on.

In practicing the invention, the mixing of granulated slag and waste pickle liquor in the proportions of ten to twelve pounds of granulated dry slag to each gallon of waste pickle liquor for a period of about five minutes will be found to give satisfactory results. This changes the pH value of the liquor from a value of one to a value of about six to seven which is considered neutral for most purposes. The product resulting from the mixture is in a damp or moist condition which may be shoveled or carted away and dumped without any liquid draining therefrom. Tests using quantities less than ten pounds of dry granulated slag per gallon of waste pickle liquor have shown that the use of smaller quantities of granulated slag will result in a neutralization, although not so great, of the acid content of waste pickle liquor. However, when smaller quantities of granulated slag are used, the resulting product will be wet from which some liquid may drain when the mixture is carted away for disposal. Accordingly, it is preferred that at least ten pounds of granulated slag be employed for treating each gallon of waste pickle liquor to avoid any drainage problems. Increasing the quantity of granulated slag beyond twelve pounds for each gallon results in a drier residue which has a high pH value. The dryness of the residue increases with the amount of granulated slag used. When seventeen pounds of granulated slag, for example, is mixed with one gallon of waste pickle liquor, the residue is too dry to determine its pH value, but leaching such residue with water gives a solution which contains no acid indicating that a high pH value is obtained.

Improved results in the treating and handling operation of this invention as described above may be had by adding a small amount of a neutralizing agent, such as lime, to the granulated slag before mixing it with the pickle liquor to be treated. Although lime is the only material which has been used for this purpose, it is contemplated that other materials such as caustic soda or soda ash may be used in place of lime with equal effect. When lime is added to the slag before it is mixed with the waste pickle liquor, the resultant product has a bluish-green color as compared to the dark gray color which is had when the waste pickle liquor is treated with slag containing no lime. The addition of lime increases the neutralizing effect and results in much higher pH values. For example, the treatment of one gallon of waste pickle liquor with twelve pounds of slag containing three-quarter pounds of lime was found to give a pH value of eleven after being mixed or agitated for a period of about five minutes. The addition of lime in relatively small quantities in this manner has been found to increase the neutralizing effect and to decrease the time of mixing required to provide a desired neutralizing effect. Tests using varying amounts of slag with varying amounts of lime have shown that the neutralizing effect varies with the content of lime added. While lime may be used in this manner, it is to be understood that the use of granulated blast furnace slag alone in the proportions stated herein is sufficient for commercial purposes since washing the residue with water will not show any noticeable acid or iron in the run-off water.

The granulated slag referred to in the proportions mentioned above was an air dried granulated slag. In practicing the invention, it has been found that the use of granulated slag delivered directly from the granulating pits requires a greater quantity of slag to compensate for its water content. Slag delivered directly from the granulating pits contains varying amounts of entrained water and consequently cannot absorb as much pickle liquor as air dried slag. In the practice of the invention using a mixing apparatus as described below, the slag used was not air dried and it will be understood that this factor accounts for the difference in the proportions of slag and pickle liquor.

Preferably the apparatus used for mixing the slag and liquor is an apparatus such as shown and described in my above mentioned copending application, Serial No. 297,579. The apparatus therein disclosed comprises a horizontal cylinder mounted for rotation about its longitudinal axis. The slag and liquid are charged separately and continuously in predetermined proportions into one end of the cylinder and discharged in an intimately mixed relation from its other end with the liquor completely absorbed in the slag. The slag is introduced preferably in a continuous stream into the charging end of the cylinder separate from the liquor. The liquor to be neutralized is poured into such charging end onto the surface of the slag therein, the liquor being preferably sprayed onto the surface of such slag so that the tumbling motion of the slag due to rotation of the cylinder will effect at least a partial or initial mixture of the slag and liquor. The liquor flowing into the cylinder in this manner washes the slag forwardly to a position where it is engaged by a spiral agitating vane secured to the inner surface of the cylinder. This vane imparts a further mixing action to the slag and liquor, and continues the forward movement of the mixture in the cylinder to its discharge end. The cylinder is provided with a fan for withdrawing steam and fumes generated by the mixing operation and for circulating air therethrough, the action of the air on the mixture having been found to increase the efficiency of the operation.

In an apparatus of this character having a mixing cylinder of about thirty feet in length, a diameter of about four feet, and a rotational speed of about 20–25 R. P. M., it has been found that a ratio of slag to liquor of about 8 to 5 parts by weight provides the most economical and desirable results from the standpoint of neutralization of the acid content of the liquor and fixation of its iron content. In the preferred practice of the invention with an apparatus of this character, about 50 tons of acid per hour may be neutralized by the use of about 80 tons of slag, the slag and liquor respectively being introduced separately and continuously in the proper proportions into the charging end, and being discharged at uniform rate of speed in an intimately mixed condition from the other end with the liquor completely absorbed in the slag. As has been indicated above, the slag used was delivered to the cylinder from the granulating pits and contained varying amounts of water, possibly as much as 30% by weight of the slag so delivered. While greater proportions of slag to liquor were used, the use of more slag was found wasteful in that the smaller amount was adequate to effect the desired degree of neutralizing and fixation of the iron content. On the other hand, the use of a lesser amount of slag will be found to result in the discharge of a mixture which is very wet and sloppy, and from which some liquid may drain which may not have been neutralized to the desired extent. For example, a small run-off of liquor which has not been completely neutralized might be found to take place when the proportions of slag and liquor are reduced to about equal parts by weight. It is preferred that the proportion of slag and liquor be kept to a value above that at which run-off takes place.

The use of the term "granulated basic blast furnace slag" herein and in the claims is meant to define and is limited to slag in which the small particles of irregular shape are formed by flowing the slag in molten condition into water, and is meant to exclude air-cooled slag which may have been reduced to small particle size by a crushing operation. Air-cooled slag particles have a relatively smooth surface and are unsuitable for the purposes of this invention.

From the foregoing, attention is particularly directed to the fact that the treatment of waste pickle liquor in accordance with the principles of this invention utilizes a steel mill waste product, namely, granulated blast furnace slag, in the neutralization of another waste product, spent pickle liquor, so that it may be disposed of in a harmless condition. Moreover, it will be apparent that the treating method of this invention is carried out without the necessity of providing any special and expensive handling and mixing apparatus for neutralizing the acid content or waste pickle liquor. In this respect, attention is particularly directed to the fact that the granulated slag absorbs the waste pickle liquor which may then be handled as by shoveling the slag in which it is contained. The waste pickle liquor may be treated and disposed of at little more cost than is now necessary in the disposal of conventional blast furnace slag alone. The product resulting from the treatment of waste pickling liquor with blast furnace slag is a neutral product which may be used as a fill or for most other purposes for which granulated blast furnace slag is now used.

The chemistry of the process of this invention will be best understood when consideration is given to the fact that the spent pickle liquor is essentially a dilute solution of sulphuric acid having relatively large amounts of ferrous sulphate in solution therein, the sulphuric acid and ferrous sulphate contents of the liquor being the harmful ingredients from the standpoint of stream pollution. The main neutralizing agent in granulated blast furnace slag is the calcium oxide. When the liquor and slag are mixed together, the calcium oxide reacts with the water in the liquor to form calcium hydroxide, a portion of which reacts with the sulphuric acid to form calcium sulphate, while another portion reacts with the ferrous sulphate to form ferrous hydroxide and calcium sulphate. The ferrous hydroxide is relatively insoluble but upon exposure to air oxidizes to the relatively more insoluble form of ferric hydroxide. Probably due to the fact that it adheres tenaciously in the interstices of the granulated slag particles upon drying, the ferrous and ferric hydroxide and the calcium sulphate cannot be dislodged even though the granulated slag particles are washed or scrubbed with water. The above is believed to describe the essential chemical reaction which takes place upon mixture of the granulated blast furnace slag and liquor.

Attention is particularly directed to the fact that the practice of this invention results in "fixation of the iron content" of the spent waste acid pickle liquor. This is a particularly desirable result which is inherent in the process described in the above mentioned copending application Serial No. 165,880, with respect to which this application has been designated a continuation-in-part application. Insofar as is presently known, no other process of neutralizing waste pickle liquor results in fixation of the iron content of the spent pickle liquor. In the most common commercial form of neutralizing pickle liquor, the lime process which was briefly mentioned above, the slurry resulting from such process contains a relatively high proportion of unfixed iron in the form of ferrous sulphate and ferrous hydroxide. The slurry cannot well be disposed of by discharging it into a stream for the reason, first, that the ferrous sulphate in large amounts is harmful, and for the further reason that the ferrous hydroxide acts as a reducing agent and takes oxygen from the water upon oxidation from its ferrous to the ferric form. The process of this invention overcomes these undesirable features in that the drying of the mixture in air completely oxidizes the ferrous hydroxide to ferric hydroxide, and in that the entire iron content, whether ferrous sulphate or ferric hydroxide is effectively locked against removal from the slag particles.

Attention is also directed to the fact that the prime concern of this invention is the conditioning of waste acid pickle liquor for disposal and in the disposal of the liquor. The conditioning and disposal are both effected by absorbing the liquor in granulated slag. It should be noted particularly that the preferred practice of the invention utilizes as little granulated slag as possible but that the amount of slag used is sufficient to prevent any liquid from draining or running off. In other words, the preferred practice requires that the granulated slag particles be saturated with waste pickle liquor and this saturation is promoted by the mechanical mixing and agitation of the liquor and slag in a mixer. The agitation of the mixture in the presence of air, particularly where ventilation is provided for, improves the operation by enabling a given quantity of slag to absorb a greater quantity of liquor and by promoting oxidation.

While I have illustrated and described one specific embodiment of my invention, it will be understood that this is merely by way of illustration, and that various changes and modifications may be made therein within the contemplation of my invention and under the scope of the following claims.

I claim:

1. The method of disposing of waste pickle liquor having ferrous sulphate and sulphuric acid in aqueous solution, comprising the steps of continuously feeding proportioned quantities of the liquor and granulated basic blast furnace slag into a zone to form a slurry thereof, continuously withdrawing the slurry from said zone, subjecting the withdrawn slurry to continuous mixing causing the acid of the solution to be substantially neutralized and the solution absorbed into the slag for reaction therewith and depositing of the reaction products upon the inner and outer surfaces of the slag, then continuously withdrawing the slag and absorbed water for air drying and fixation of the reaction products in the slag.

2. The method as defined in claim 1 wherein the proportion of slag to liquor is sufficient to prevent any run-off of water from the slag when moved to air drying.

3. The method as defined in claim 1 wherein the ratio by weight of dry granulated basic blast furnace slag to the liquor forming the slurry is not less than unity.

4. In the method of disposing of waste pickle liquor comprising sulphuric acid and ferrous sulphate in aqueous solution, the steps of mixing the liquor with a sufficient quantity of granulated basic ferrous slag to react with and substantially neutralize the acid of the solution, absorbing the solution into the slag during such mixing for reaction therewith and depositing of the reaction products thereon, then air drying the slag to fix the iron of the reaction products therein as substantially water-insoluble iron compounds.

References Cited in the file of this patent

UNITED STATES PATENTS

| | | |
|---|---|---|
| 1,139,618 | Williams | May 18, 1915 |
| 1,171,046 | Heckman | Feb. 8, 1916 |
| 2,532,548 | Heide | Dec. 5, 1950 |

OTHER REFERENCES

Ind. and Eng. Chem. 39, 614–18 (1947), by R. D. Hoak.